(12) United States Patent
Kubota

(10) Patent No.: US 6,462,289 B1
(45) Date of Patent: Oct. 8, 2002

(54) OPERATING MECHANISM FOR STEERING COLUMN MOUNTED LEVER SWITCH

(75) Inventor: Minoru Kubota, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 30 days.

(21) Appl. No.: 09/655,874

(22) Filed: Sep. 6, 2000

(30) Foreign Application Priority Data

Sep. 7, 1999 (JP) .......................................... 11-252517

(51) Int. Cl.⁷ ................................................. H01H 9/00
(52) U.S. Cl. ................................. 200/61.54; 200/61.27
(58) Field of Search ......................... 200/61.54–61.57, 200/61.27, 61.38

(56) References Cited

U.S. PATENT DOCUMENTS 5,003,132 A * 3/1991 Lagier ............................ 200/4
6,114,640 A * 9/2000 Oddo et al. ............... 200/61.27
6,183,005 B1 * 2/2001 Nishijima et al. ........ 200/61.54

FOREIGN PATENT DOCUMENTS

JP 10-340651 12/1998

\* cited by examiner

Primary Examiner—J. R. Scott
(74) Attorney, Agent, or Firm—Armstrong, Westerman & Hattori, LLP

(57) ABSTRACT

A steering assembly having a switch device attached to a steering column which rotatably supports a steering wheel. The steering wheel includes a steering wheel boss, a steering wheel ring and steering wheel spokes coupling the boss and the ring. The switch device is composed of an operating shaft and a first operating ring formed around it. The entire length of the operating shaft is set that its tip is located between an outer edge and an inner edge of the steering wheel ring in a radial direction of the steering wheel. The first operating ring provided around the operating shaft is rotatable in both directions.

5 Claims, 7 Drawing Sheets

OPERATING MECHANISM FOR STEERING COLUMN MOUNTED LEVER SWITCH

BACKGROUND OF THE INVENTION

1. Field of the Invention

The present invention relates to a switch device for operating several kinds of appliances which are installed in a motor vehicle serving as a moving body.

2. Field of the Invention

The motor vehicle serving as a moving body incorporates several kinds of appliances such as a car radio and a car navigation system. These appliances each is equipped with plural operation switches and dial switches.

Further, the steering column of the motor vehicle is generally equipped with a lever switch for operating several kinds of appliances such as an illumination device, wiper device and blinker.

Such a lever includes a shaft body with its stem attached to a steering column and an operating body which is retractable or rotatable on the shaft body. The shaft body of the conventional lever switch is formed to have such a length that its tip is located on the outer periphery of the ring of the steering wheel.

Where the operating body is rotatable on the shaft body, the rotating operation was given a sense of click by a well known clicking mechanism. In this case, the operating body is urged by a relatively strong force so that its displacement on the shaft body in a rotating direction correctly indicates the position at the present time. Therefore, a driver was required to grasp the operating body by a relatively strong force and thereafter rotate the operating body.

When the driver intends to operate several kinds of switches for the car radio or navigation system, he must once shift his viewpoint from the state of looking ahead of a vehicle to that of looking at the several kinds of switches. In addition, he must once cease to grasp the steering wheel and operate the various switches. The operability of the appliances was difficult.

SUMMARY OF THE INVENTION

In view of the difficulties of the conventional lever switches, an object of the invention is to provide a switch device capable of facilitating the operability of various appliances.

In order to attain the above object, in accordance with the invention, there is provided a switch device attached to a steering column which rotatably supports a steering wheel for a vehicle composed of a boss, a ring located around it and a coupling member for coupling the boss and the ring, comprising:

an operating shaft attached to the steering column;

an operating body attached to the operating shaft so that it is retractable from and rotatable around the operating shaft, wherein the entire length of the operating shaft is shorter than a distance from the hub to an outer edge of the ring.

In this configuration, since the entire length of the operating shaft is shorter than a distance from the hub to an outer edge of the ring, a driver can operate the operating body while holding the steering wheel ring.

Preferably, the entire length of the operating shaft is set so that its tip is located between the outer edge and inner edge of the ring in a radial direction of the steering wheel ring.

In this configuration, the driver can operate the operating body more surely while holding the steering wheel ring.

Preferably, the operating body is formed in a cylindrical form and arranged coaxially with the operating shaft, and provided around the operating shaft so as to be rotatable in directions opposite to each other.

In this configuration, the operating body can be used to adjust the quantity of status such as sound volume of a car radio that is successive with no step. Further, the driver can exchange the function of the appliance according to the rotating angle of the operating body.

Preferably, the operating body includes an attaching member rotatably attached to the operating shaft and an operating portion extending from the attaching member along the operating shaft, a frame member is provided which is attached to the operating shaft and has a supporting member for supporting the operating member, and the operating body is made of synthetic resin having a low friction coefficient between the operating shaft and the attaching member and between the supporting portion of the frame member and the operating portion.

In this configuration, the driver can operate the operating body more surely while holding the steering wheel ring.

Preferably, the operating body is made of synthetic resin having a low friction coefficient between the operating shaft and the attaching member and between the supporting portion of the frame member and the operating portion.

In this configuration, the operating body can be rotated around the operating shaft by relatively small operating force.

Preferably, the operating shaft is arranged along the coupling portion. Therefore, the driver can operate the operating body more surely while holding the steering wheel ring.

The above and other objects and features of the present invention will be more apparent from the following description taken in conjunction with the accompanying drawings.

DESCRIPTION OF THE PREFERRED EMBODIMENTS

Figure 1:
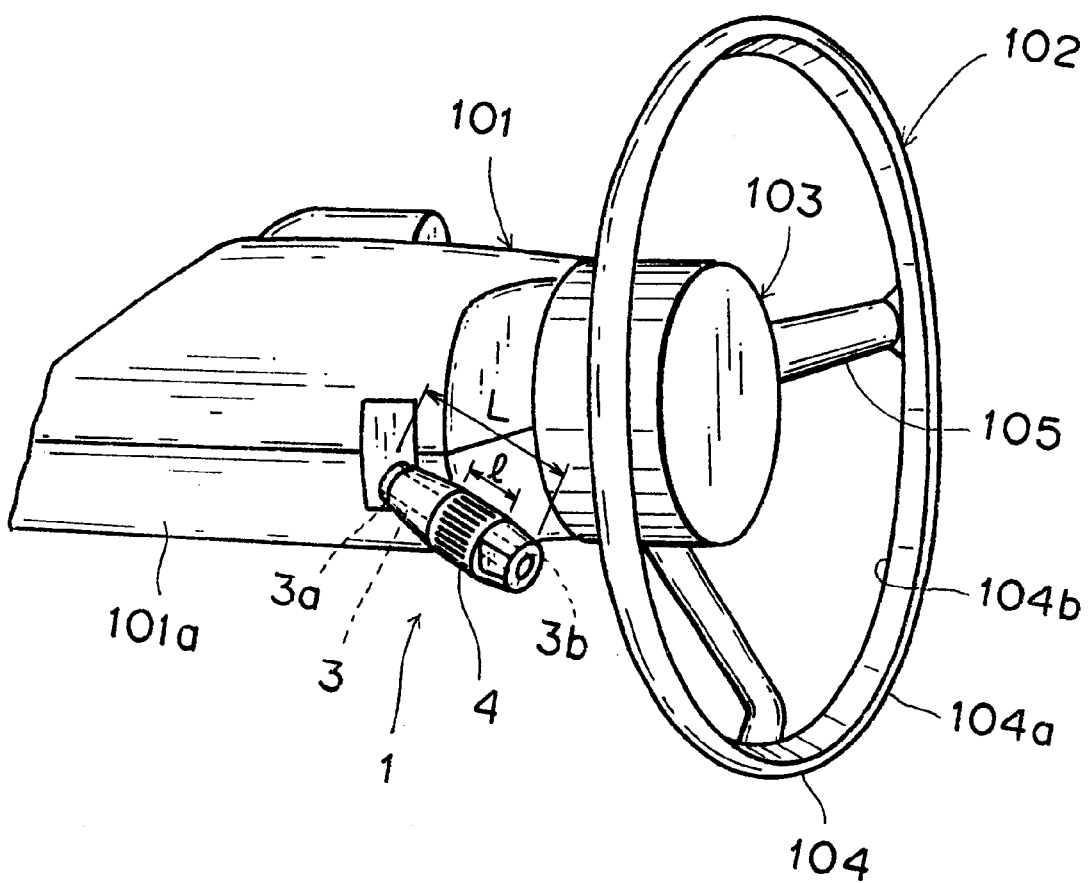
FIG. 1 is a perspective view of the vicinity of a steering column to which a lever switch according to a first embodiment of the invention is attached.

Now referring to the drawings, an explanation will be given of embodiments of the invention.

Embodiment 1

Referring to FIGS. 1 to 8, an explanation will be given of a switch device (lever switch) according to the first embodiment of the invention.

As seen from FIG. 1, a lever switch 1 is attached to a steering column 101 and employed to operate various appliances such as a car radio and a car navigation system.

A steering wheel 102 is rotatably supported by the steering column. As seen from FIGS. 1 and 2, the steering wheel 102 is composed of a steering boss 103, which is rotatably supported by the steering column 101; a steering wheel ring 104 which is arranged to surround the outer periphery of the steering wheel boss 103; and a plurality of steering wheel spokes 105 which couple the steering wheel boss 103 and the steering wheel ring 104 with each other.

The steering wheel boss 103 is formed in a disk shape. The steering wheel ring 104 is formed in a ring shape having a larger inner diameter than the outer diameter of the steering wheel boss 103. The steering wheel ring 104 is arranged coaxially with the steering wheel boss 103.

Each steering wheel spoke 105 is formed in a belt shape. The plurality of steering wheel spokes 105 are arranged at intervals circumferentially of the steering wheel ring 104. The steering wheel spokes 105 are extended in a radial direction toward the steering wheel ring 104 from the steering wheel boss 103.

Each steering spoke 105 is sloped from the one end attached to the steering wheel boss 103 to the other end attached to the steering wheel ring 104 in the radial direction of the steering wheel 104. In this embodiment, three steering spokes 105 are arranged.

The steering column 101 rotatably supports the steering wheel 102 in such a manner that it rotatably supports the steering wheel boss 103. The steering column 101 is covered with a steering column cover 101a.

A lever switch 1 is attached to the steering column 101 at a position close to the steering wheel 102.

Figure 3:
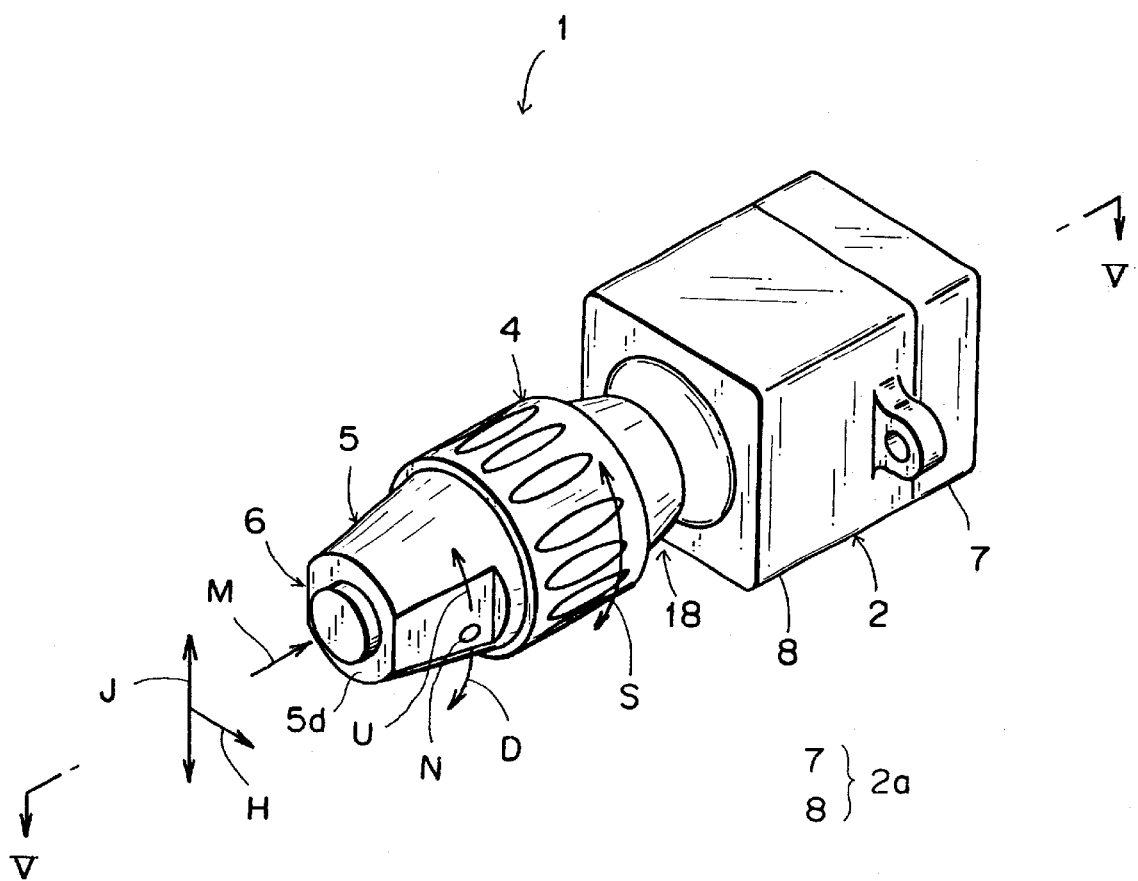
FIG. 3 is a perspective view of the lever switch according to the first embodiment.
Figure 4:
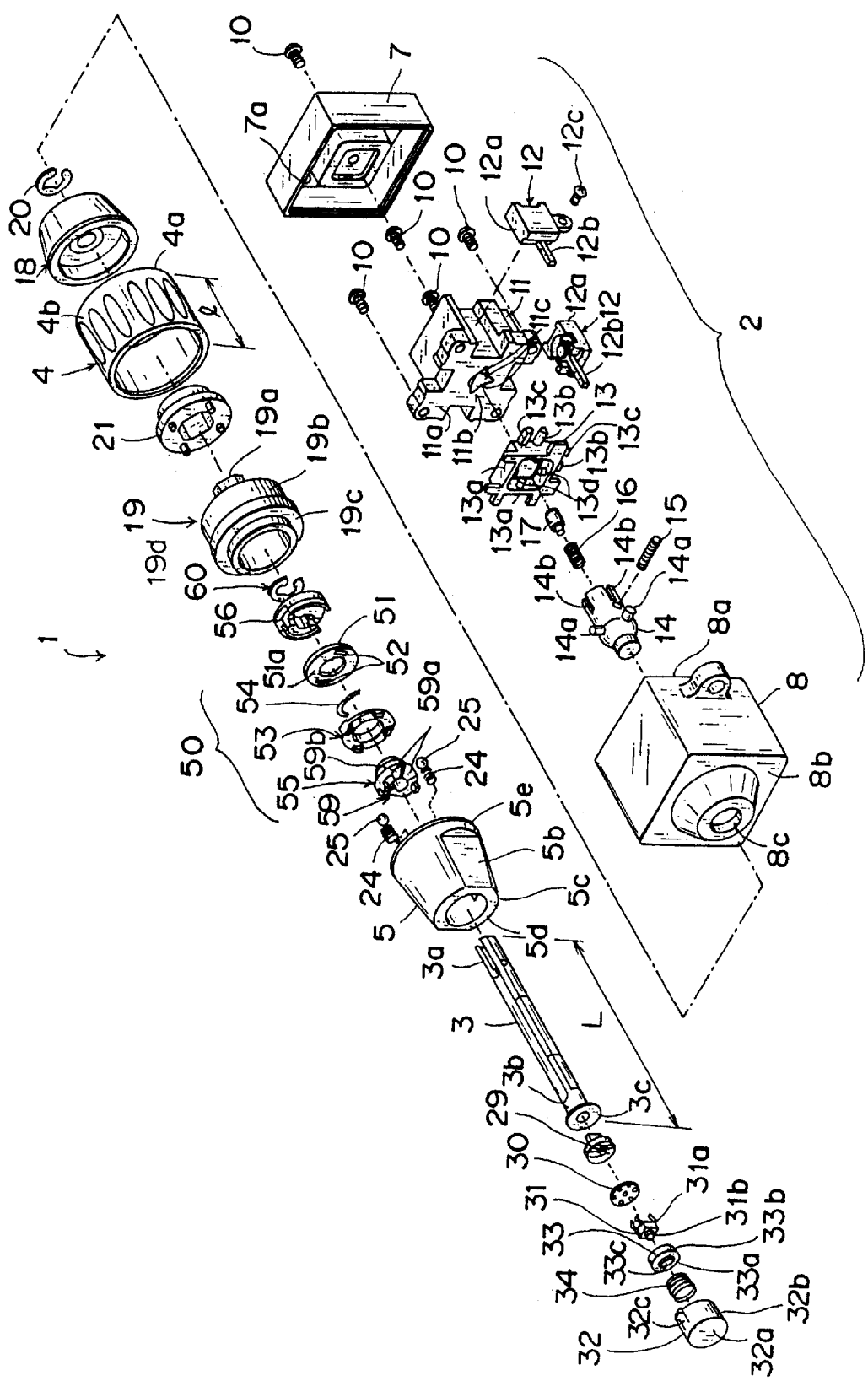
FIG. 4 is a perspective view of the state where the lever switch shown in FIG. 3 is dismantled.
Figure 5:
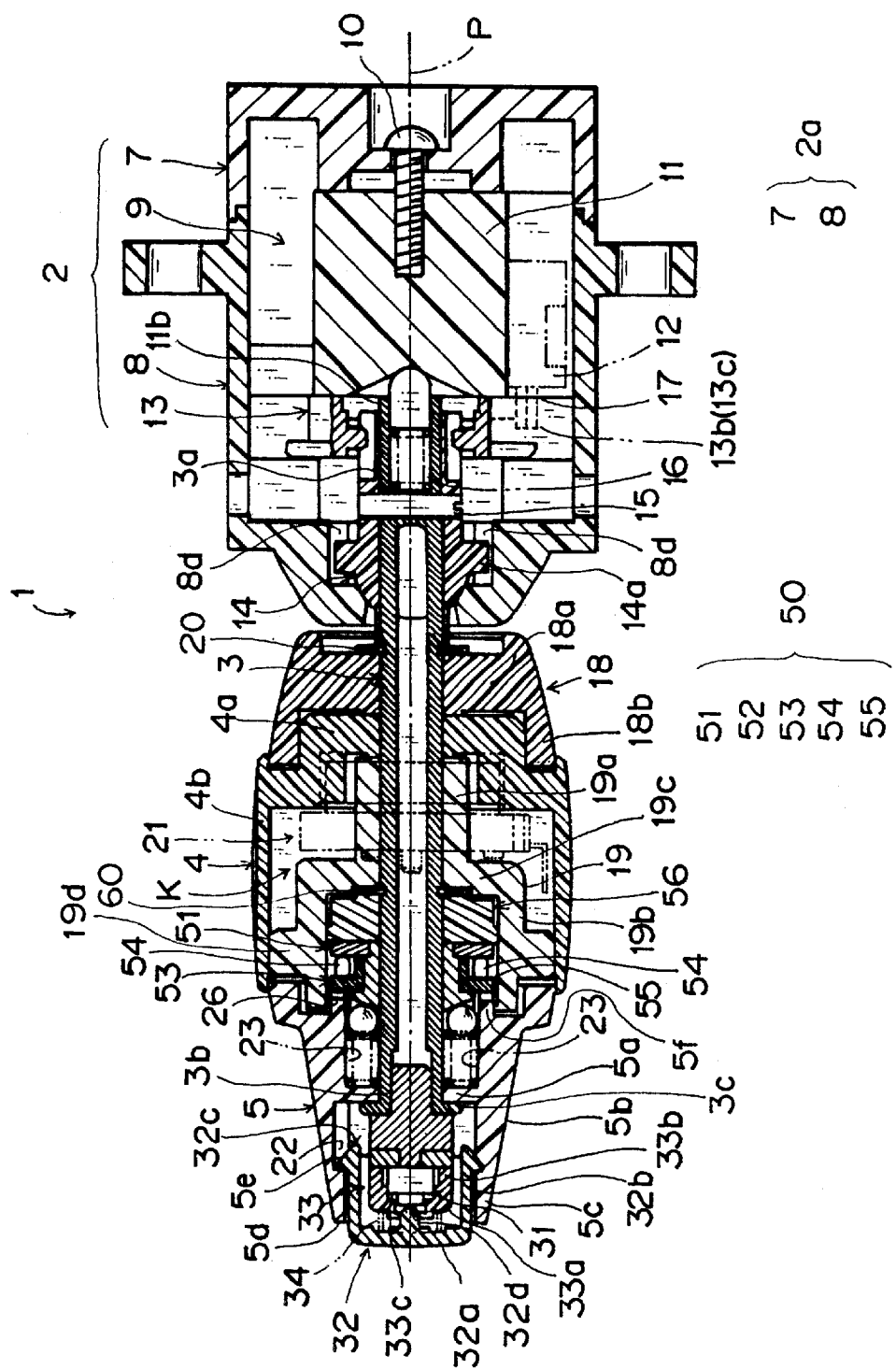
FIG. 5 is a sectional view taken in line V—V in FIG. 3.
Figure 6:
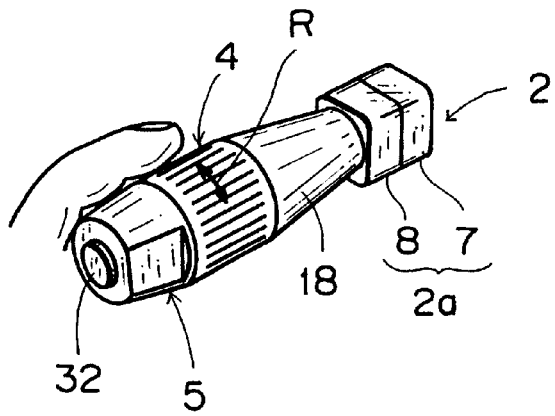
FIG. 6 is a perspective view of an operating state of the lever switch according to the first embodiment.
Figure 7A:
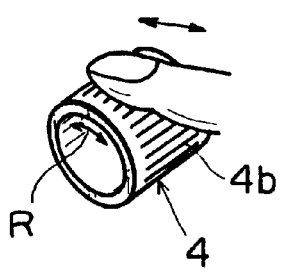
FIGS. 7A and 7B are views for explaining the operating state of a first operating ring of the lever switch according to the first embodiment.
Figure 7B:
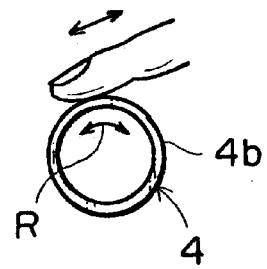
Figure 8:
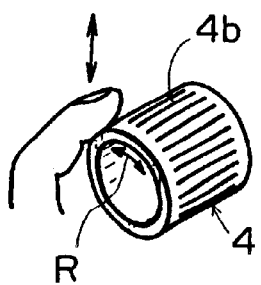
FIG. 8 is a view for explaining the operating state of the first operating ring of the lever switch according to the first embodiment.

As seen from FIGS. 3 to 5, the lever switch 1 includes a supporting portion 2, an operating shaft 3, a first operating ring 4, a second operating ring 5 and an operating switch 6. The supporting portion 2 includes a supporting case 2a and a supporting portion 9 for supporting the operating shaft 3.

As seen from FIG. 4, the supporting case 2a includes a rear case 7 and a front case 8. The rear case 7 is formed in a box shape having an opening 7a when the lever switch 1 is attached to the steering column 101. The front case 8 is formed in a box shape having an opening 8a opposite to the opening 7a. The front case 8 is attached to the rear case 7 so that the opening 8a covers the opening 7a.

The front case 8 includes a through-hole 8c made on the wall opposite to the opening 8a, through which the operating shaft 3 can pass, and a plurality of concave grooves 8d formed on the inner periphery of the through-hole 8c (FIG. 5).

The supporting portion 9 is accommodated within the supporting case 2a. It includes a base body 11 which is secured to the front case 8 by a plurality of screws 10, a plurality of switches 12, a sliding member 13 arranged between the base body 11 and the wall 8b, and a connecting tube 14.

The base body 11 includes a flat face 11a, which is opposite and in parallel to the wall 8b of the front case 8 and a concave portion 11b centrally located on the flat face 11a. The concave portion 11b includes a plurality of concave grooves 11c which extend outwardly from the center of the flat face 11a. The concave grooves 11c are sloped so that their bottom surfaces gradually approach the flat surface 11a outwardly from the center of the flat surface 11a.

The switch 12 includes a switch body 12a which is attached to the base body 11 by a screw 12c and a shifting shaft 12b. The shifting shaft 12b is arranged so as to protrude from the switch body 12a to the front case 7. The shifting shaft 12b is attached swingably to the switch body 12a.

The switch 12 is electrically connected to the appliance such as a car navigation system. For example, when the operating shaft 3 is swung with respect to the supporting portion 2, the shifting shaft 12b swings with respect to the switch body 12a so that the switch 12 issues a desired signal to the appliance.

The sliding member 13 is formed in a frame shape. In the illustrated example, the sliding member 13 is formed in a square frame having four side members 13a. The sliding member 13 includes projections 13b, 13c and 13d. Two pairs of projections are provided to protrude from the side members 13a outwardly.

The pair of projections 13b and 13c sandwiches the shifting shaft 12b of the switch 12. The projections 13d serves to hold the connecting tube 14 and are formed to protrude inwardly from the four side members 13a.

The connecting tube 14 is arranged between the sliding member 13 and the wall 8b of the front case 8. The connecting tube 14 is formed in a cylindrical shape into which the operating shaft 3 is inserted. The connecting tube 14 includes a plurality of guiding projections 14a which protrude outwardly and a plurality of fitting grooves 14b provided at the end located on the side of the sliding member 13.

The guide projections 14a are fit in the concave grooves 8d of the front case 8. The fitting groove 14b is extended from the end on the sliding member 13 to the center in the longitudinal direction. The fitting groove 14b is coupled with the projection 13d.

An attaching pin 15 is adapted to be externally fit into the connecting tube 14. When the stem 3a of the operating shaft 3 is inserted into the connecting tube 14, the attaching pin 15 serves to prevent the operating shaft 3 from coming off from the connecting tube 14. When the stem 3a of the operating shaft 3 is inserted into the connecting tube 14, a coil spring 16 and pin 17 are attached to the tip 3a.

The coil spring 16 holds the pin 17 at the stem 3a of the operating shaft 3 in a state where the pin 17 is urged toward the base body 11. The pin 17 is provided in a state where it is inserted in the concave portion 11b made on the flat face 11a of the base body 11.

The supporting portion 2 having the configuration described above is attached to the steering column 101 in a state where it is housed in the steering column cover 101a.

In the arrangement described above, when the stem 3a of the operating shaft 3 is inserted into the connecting tube 14, the guide projections 14a of the connecting tube 14 fit in the grooves 8d of the front case 8, and the projections 13d fit into the fitting grooves 14b. Further, the pin 17 is inserted into the concave portion 11b, and the shifting shaft 12 is sandwiched by the projections 13b and 13c.

When a driver is going to swing the tip 3b of the operating shaft 3 along arrows H and J in FIG. 3, the guide projections 14a are guided by the grooves 8d of the front case 8 so that the operating shaft 3 swings. The sliding member 13 slides along the flat face 11a, i.e. in a direction orthogonal to the axial line of the operating shaft 3. The shifting shaft 12b sandwiched by the projections 13b and 13c swings for the switch body 12a to produce a desired signal to the appliance (not shown).

When the driver ceases to swing the operating shaft 3, the pin 17 is guided by the bottom of the grooves 11c because of elastic restoring force so that it moves toward the center of the flat face 11a. Thus, the operating shaft 3 is restored to the initial state as shown in FIG. 5.

The operating shaft 3 is formed in a hollow-cylindrical shape with a prescribed inner diameter along the axial line P. The operating shaft 3 is attached to the supporting section 2 in such a manner that the stem 3a is supported by the supporting portion 9 and the tip 3b protrudes outwardly from the supporting case 2a. The tip of the operating shaft 3 has an integral flange 3c protruding outwardly. The operating shaft 3 is made of steel.

The stem 3a of the operating shaft 3 is attached to the steering column 101 when the operating shaft 3 is attached to the supporting section 2. The operating shaft 3 has a length L (FIGS. 2 and 4) that is shorter than a distance d from the steering wheel boss 103 to the outer edge 104a of the steering wheel ring 104. The relative lengths of L and d are best viewed in FIG. 2.

The operating shaft 3 has such an entire length L that when the supporting section 2 is attached to the steering column 101, the tip 3b is located between the outer periphery 104a and inner periphery 104b of the steering wheel 104 in its radial direction. The operating shaft 3 is arranged along the steering spoke 105 when it is attached to the steering column 101.

Figure 2:
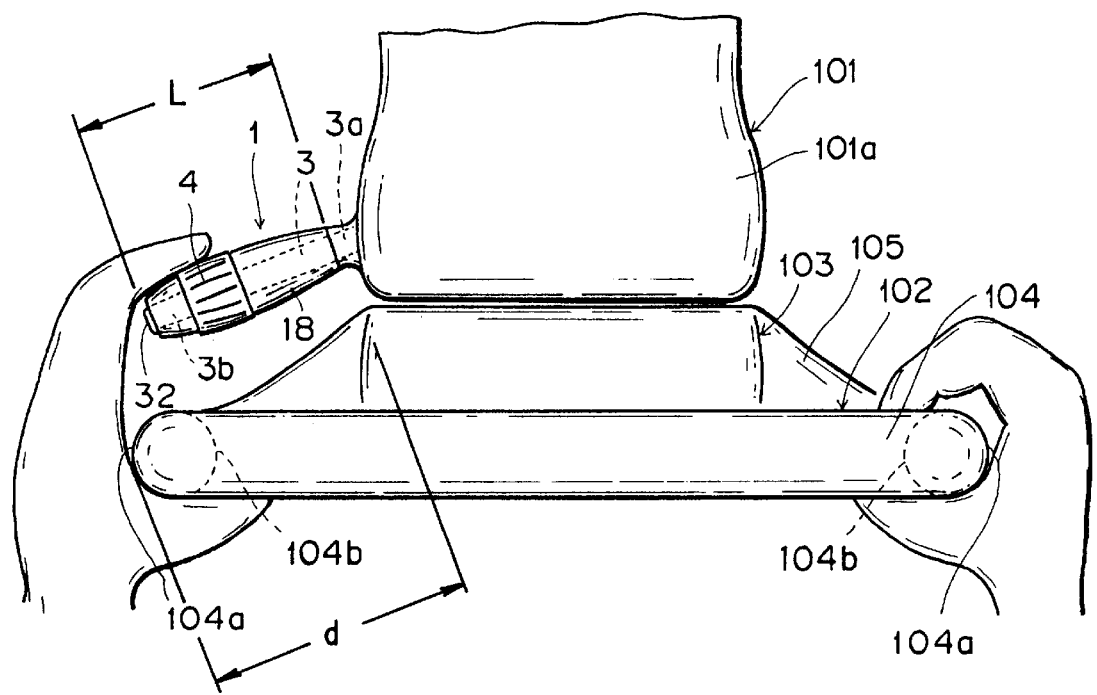
FIG. 2 is a plan view showing the relative positions of the lever switch according to the first embodiment of the invention in relation to a steering wheel.

The first operating ring 4 is formed in a bottomed cylindrical shape having a bottom 4a serving as an attaching member and a cylinder 4b serving as an operating member. The first operating ring 4 is rotatably supported around the operating shaft 3 by a cover member 18 and a frame member 19. The first operating ring 4 is arranged closer to the tip 3a of the operating shaft 3 than to the supporting case 2a (FIG. 2).

The cover member 18 is secured to the outer periphery of the operating shaft 3. The cover member 18 is formed in a bottomed shape having a bottom 18a and a cylinder 18b. The cover member 18 is arranged in a state where the operating shaft 3 passes through the bottom 3 opposite to the front case 7. The cover member 18 is positioned by an E ring 20.

The frame member 19 is secured to the outer periphery of the operating shaft 3. The frame member 19 includes an inner cylinder 19a, an outer cylinder 19b and a coupling member 19c which couples these cylinders 19a and 19b.

The inner cylinder 19a is arranged in a state where the operating shaft 3 is passed through the inner cylinder. The inner cylinder 19a is spaced apart from the bottom 18a of the cover member 18. The outer cylinder 19b includes, on the side of its outer periphery, a supporting member 19d that supports the cylinder 4b of the first operating ring 4. The supporting body 19d is shaped to protrude from the outer cylinder 19b toward the outer periphery of the frame member 19.

The frame member 19 is made of known synthetic resin such as Acrylonitrile Butadiene Styrene (ABS) resin.

The first operating ring 4 is arranged in a state where the operating shaft 3 is passed through the bottom 4a that is sandwiched between the bottom 18a of the cover member 18 and the inner cylinder 19a of the frame member 19. The cylinder 4b of the first operating ring 4 is supported by the supporting member 19d.

The first operating ring 4 has a width l measured in an axial direction of the ring that ranges from 20% to 80% of the entire length L of the operating shaft 3 (FIG. 4). In other words, the width l of the first operating ring 4 has a relatively shorter length compared to the entire length L of the operating shaft 3. The bottom 4a and cylinder 4b of the first operating ring 4 are made of the known synthetic resin such as ABS resin.

The first operating ring 4, which is made of the synthetic resin such as ABS resin, has a relatively small friction coefficient between the operating shaft 3 and the bottom 4a and between the supporting portion 19d and the cylinder 4b. Therefore, as seen from FIGS. 6, 7 and 8, when the cylinder 4b is shifted by a finger in a circumferencial direction, the first operating ring 4 can be rotated around the operating shaft 3 by a relatively small force.

A space K is formed between the cylinder 4b of the first operating ring 4 and the inner cylinder 19a and coupling portion 19c of the frame member 19. A rotary encoder 21 is arranged in the space K. The rotary encoder 21 serves to detect the rotary displacement around the axial line P of the first operating ring 4.

The rotary encoder 21 is electrically connected to the appliance such as a car radio. The rotary encoder 21 supplies a pulse signal to the appliance whenever the rotary displacement of the first operating ring 4 reaches a prescribed degree, e.g. 10 degrees.

The first operating ring 4, cover member 18 and frame member 19 are positioned by the E rings 20 and 60 so that they are not shifted along the axial direction P.

A second operating ring 5 is formed in a cylindrical shape and attached to the tip 3b of the operating shaft 3 so that it is rotatable around the operating shaft 3. The second operating ring 5 is provided shiftably from the flange 3c to the stem 3a against the urging force of a coil spring 24 as described later.

The second operating ring 5 includes a supporting portion 5a and an operating portion 5b. The supporting portion 5a is located on the side of the stem 3a of the flange 3c and on the outer periphery of the operating shaft 3. The cylindrical operating portion 5b is formed in a cylindrical shape on the outer periphery of the supporting portion 5a.

A engagement receiver 22 is provided at an end 5c of the operating portion 5b on the side of the tip 3b of the operating shaft 3. More specifically, the engagement receiver 22 is located nearer to the stem 3a of the operating shaft 3 than the end face 5d of the operating portion 5b. The receiver 22 has a level difference or step 5e where the inner diameter of the operating shaft 5b becomes stepwise large.

When the second operating ring 5 is attached to the operating shaft 3, it has a plurality of holes 23 extended along the axial line P of the operating shaft 3. The holes 23 are arranged at intervals in a circumferencial direction of the second operating ring 5. In the illustrated example, two holes are provided. These holes 23 are opened in their ends opposite to a fixing member 55 described later.

A coil spring 24 serving as an urging means and a ball 25 serving as a roller are accommodated in the hole 23. The coil spring 24 and ball 25 are positioned in a circumferencial direction of the second operating ring 5, and rotate together with the second operating ring 5 around the axial line P of the operating shaft 3.

The ball 25 is located oppositely to the fixing member 55 and can freely roll on the cam face 59a (described later) of the fixing member 55. A roller may be used instead of the ball 25.

The coil spring 24 urges the ball 25 toward the step of the operating shaft 3, i.e. toward the fixing member 55, and also urges the second operating ring 5 toward the direction leaving from the fixing member 55, i.e. the tip 3b of the operating shaft 3.

When the ball 25 is urged toward the stem 3a of the operating shaft 3 by the coil spring 24, it rolls on the above cam face 59a so that it is located on the bottom 59b of the cam concave portion 59. This state corresponds to the neutral position N (FIG. 3) in the circumferencial direction of the second operating ring 5.

When the second operating ring 5 rotates around the operating shaft 3 from the neutral position N, the ball 25 is shifted on the cam face 59a against the urging force by the coil spring 24 in a direction exiting from the cam concave portion, i.e. approaching the second operating shaft 5 along the cam face 59a.

When the rotating operation of the second operating ring 5 is released, the second operating ring 5 is rotated toward the neutral position N where the ball 25 is located at the bottom 59b of the cam concave portion 59.

The operating switch 6 is attached to the tip 3b of the operating shaft 3 (FIG. 3). The operating switch 6 includes a push switch 31, which is attached to the tip 3b of the operating shaft 3 through an attaching piece 29 and an insulating sheet 30, and a switch cover 32 which covers the push switch 31 from the tip 3b of the operating shaft 3.

The push switch 31 includes a switch body 31a and an operating piece 31b that is retractable therefrom. The switch body 31a is attached to the tip 3b of the operating shaft 3 through the attaching piece 29 and the insulating sheet 30. The operating piece 31b is urged in a direction protruding from the switch body 31a by a spring (not shown).

The switch body 31a is attached to the tip 3b of the operating shaft 3 in a state where the operating piece 31b is protruding toward the tip 3b of the operating shaft 3. The push switch 31 is electrically connected to the appliance such as a car navigation system. When the operating piece 31b is pushed, the push switch 31 supplies a desired signal to the car navigation system.

A switch holder 33 is provided between the push switch 31 and switch cover 32. The switch holder 33 is formed in a bottomed cylindrical shape composed of a bottom 33a and a cylinder 33b. The bottom 33a has a through-hole 33c through which the operating piece 31b of the push switch 31 is exposed.

The switch holder 33 is attached to the tip 3b of the operating shaft 3 in a state where the bottom 33a is located on the side of the tip 3b of the operating shaft 3 and the operating piece 31b is exposed through the through-hole 33c.

The switch cover 31 is formed in a bottomed cylindrical shape composed of a bottom 32a and a cylinder 32b. The cylinder 32b has an engaging piece 32c formed at its outer edge, which can be engaged with the step 5e of the engagement receiver 22. The engagement piece 32c is formed in a hook shape protruding outwardly from the outer edge of the cylinder 32b.

The bottom 32a has a convex portion 32d which is opposite to the operating piece 31b when the engagement piece 32c is engaged with the step 5e. The convex portion 32d protrudes from the inner face of the bottom 32a toward the operating piece 31b. The convex portion 32d is formed in a size enough to be inserted into the switch holder 33 through the through-hole 33c.

The switch cover 32 is attached to the tip 3b of the operating shaft 3 in a state where the engagement piece 32c is engaged with the step 5e and the convex portion 32d is opposite to the operating piece 31b.

A coil spring 34 is provided between the switch cover 32 and the switch holder 33. The coil spring 34 urges the switch cover 32 in a direction leaving from the switch holder 33, i.e. toward the tip 3b of the operating shaft 3.

In the configuration described above, when the switch cover 32 is pushed toward the stem 3a of the operating shaft 3 against the elastic restoring force of the coil spring 34, the convex portion 32d enters the switch holder 33 through the through-hole 33c so that the operating piece 31b is pushed to sink in the switch body 31a. Then, the push switch 31 produces a desired signal toward the appliance such as the car navigation system.

On the other hand, when the pushing operation of the switch cover 32 is released, the operating piece 31b is restored to the protruding state from the switch body 31 because of the elastic restoring force (not shown). Because of the elastic restoring force of the coil spring, the switch cover 32 is also restored to the state where the convex portion 32d does not push the operating piece.

A contact member 50 is provided inside the outer cylinder 19b of the frame member 19. The contact member 50 transmit to the stem 3a of the operating shaft 3 the information on if or not the second operating ring 5 has been rotated.

As seen from FIGS. 4 and 5, the contact member 50 includes a secured plate 51, contact piece 52, a supporting member 53 which is rotatable in interlock with the second operating ring 5, a flat spring 54 and a secured member 55 secured to the operating shaft 3.

The secured member 55, which is ring-shaped, is secured to the outer periphery of the operating shaft 3 in a state where the operating shaft 3 is passed through the inner periphery. The secured member 55 is arranged so that its one end is opposite to the insulating sheet 56 and the other end is opposite to the second operating ring 5.

The secured member 55 has a plurality of steps having their outer diameters becoming larger stepwise from the one end to the other end. The secured plate 51 is secured to the one end of the secured member 55, i.e. on the side of the insulating sheet 56. The supporting member 53 is kept in contact with the other end of the secured member 55.

The secured member 55 has a plurality of cam concave portions at its other end. The cam concave portions 59 are formed in concave shapes in a direction leading from the second operating ring 5 to the face of the other end of the secured member 55. The cam concave portions 59 are arranged at regular intervals around the axial line P of the operating shaft 3 when the secured member 55 is attached to the operating shaft 3. In the illustrated example, two cam concave portions are provided. Each of the cam concave portions 59 is composed of a pair of cam faces 59a. The cam faces 59a are sloped in both directions of the circumferencial direction of the secured member 55 and the axial direction of the operating shaft 3. The cam faces 59a are coupled with each other on the bottom of the cam concave portion 59, which is farthest from the end face of the secured member 55.

The secured plate 51, which is ring-shaped, is secured to the secured member 55 in such a manner that it is coupled with the outer periphery of the secured member 55. Thus, the secured plate 51 is secured to the operating shaft 3.

The secured plate 51 is also secured to the one end of the secured member 55. As shown in FIG. 5, the secured plate 51 is opposite to the coupling portion 19c of the frame member 19. An insulating sheet 56 and an E ring 60 are provided between the secured plate 51 and the coupling portion 19c of the frame member 19.

The contact piece 52 is provided on the side of the tip 3b of the operating shaft 3 of the secured plate 51, i.e. on the end face 51a thereof opposite to the second operating ring 5. The contact piece 52 is formed in an arc-shaped band which is extended coaxially with the secured plate 51.

When the second operating ring 5 is rotated around the axial line P against the elastic restoring force of the coil spring 24, the contact piece 52 is brought into contact with the flat spring 54 so that they are electrically connected to each other. When the second operating ring 5 is restored to the neutral position N by the elastic restoring force of the coil spring 24, the contact piece 52 is not brought into contact with the flat spring 54 so that they are not electrically connected to each other. In this way, when the second operating ring is rotated, the contact piece 52 is brought into slidable contact with the flat spring 54.

The supporting member 53 is ring-shaped to have a larger inner diameter than the outer diameter of the secured member 55. The supporting member 53 is arranged so as to be opposite to the second operating ring 5 and contact piece 52, respectively. The supporting member 53 holds the flat spring 54 at its end face opposite to the contact piece 52.

Namely, the flat spring 54 is located on the outer periphery of the secured member 55 and between the second operating ring 5 and the contact piece 52 along the axial line P. The flat spring 54 is formed in an arc shape in a circumferencial direction of the supporting member 53. When the flat spring 54 is brought into contact with the secured plate 51 and the contact piece 52, it produces elastic force of urging the supporting member 53 in a direction leading from the contact piece 52.

When the second operating ring 5 is located at the above neutral position N, the flat spring 54 is located at the position not in contact with the contact piece 52. When the second operating ring 5 is rotated arrow U or D (FIG. 3), the flat spring 54 is brought into contact with the contact piece 52 so that they are electrically connected to each other.

When the flat spring 54 urges the supporting member 53 in a direction leaving from the contact piece 52, the supporting member 53 is brought into contact with the secured member 55. The supporting member 53 is positioned along the axial line P by the elastic force of the flat spring 54 and the second step 58.

In the lever switch 1 having the configuration described above, when the switch cover 32 is pushed in a direction sinking in the end face of the second operating ring 5 along arrow M in FIG. 3, the operating piece 31b of the push switch 31 is pushed so that it is sunk into the switch body 31a. Then, the push switch 31 supplies a desired signal to the car navigation system. Then, the car navigation system displays e.g. traffic information on the display device.

When the first operating ring 4 is rotated around the operating shaft 3 along arrow S in FIG. 3, the rotary encoder 21 supplies a pulse signal to e.g. the car radio for each rotation of a prescribed angle. Thus, the volume of the car radio becomes more or less.

When the second operating ring 5 is rotated along arrow U or D in FIG. 3 from the neutral position N, the flat spring 54 and contact piece 52 are brought into contact with each other and electrically connected to each other. In this case, for example, the prescribed frequency of the car radio is increased or decreased to tune the car radio. Incidentally, when the second operating ring 5 is released from its rotating operation, it is restored to the neutral position by the urging force of the coil spring 24.

When the entire lever switch 1 is operated toward the driver along arrow H in FIG. 3, the shifting shaft 12b of the switch 12 swings for the switch body 12a to supply a desired signal to the car navigation system. In this case, for example, the car navigation system displays the present position of the motor vehicle on the display device.

When the entire lever switch 1 is operated vertically along arrow J in FIG. 3, the shifting shaft 12b of the switch 12 swings for the switch body 12a to supply a desired signal to the car navigation system. Then, for example, the car navigation system exchanges the map information displayed on the display device into that in a wider area or that in a more detailed and smaller area.

In the lever switch according to this embodiment, the entire length L of the operating shaft 3 attached to the steering column 101 is made shorter than the distance from the steering boss 103 to the outer edge 104a of the steering wheel ring 104.

The entire length L of the operating shaft 3 is set so that its tip 3b is located between the outer edge 104a and inner edge 104b of the steering wheel ring 104 in a radial direction of the steering wheel 102. The operating shaft 3 is arranged along the wheel spoke 105.

Thus, the driver can operate the first operating ring 4 while holding the steering wheel ring 104. For this reason, when the driver operates the first operating ring 4, he is not required to shift the viewpoint to the first operating ring 4 from the front. This is useful to facilitate the operability of various kinds of appliances.

The first operating ring 4 is provided around the operating shaft 3 rotatably in both directions. For this reason, the first operating ring 4 can be used to adjust the quantity of status such as sound volume of a car radio that is successive with no step. Thus, the driver can operate the appliance such as the car radio while holding the steering wheel so that the operability of the appliance such as the car radio can be improved.

For the same reason, the drive can exchange the function of the appliance according to the rotating angle of the first operating ring 4. Specifically, by rotating the first operating ring 4, the driver can change the set frequency of the car radio and the map information to be displayed on the display device so that the operability of the appliance such as the car radio and car navigation system can be improved.

The width l of the first operating ring 4 ranges from 20% to 80% of the entire length L of the operating shaft 3 (FIG. 4). In other words, the width l of the first operating ring 4 has a relatively shorter length compared to the entire length L of the operating shaft 3. For this reason, the driver can surely operate the first operating ring 4 while holding the steering wheel ring 104.

Since the first operating ring 4 can be rotated around the operating shaft 3 by relatively small force, as seen from FIGS. 6, 7A, 7B and 8, the driver can surely rotate the first operating ring 4 around the operating shaft 3 even when he rotates it in a circumferencial direction by his finger along arrow R while holding the steering wheel ring 104.

Thus, the driver can more surely shift his viewpoint from the front when he operates the first operating ring 4 so that the operability of various kinds of appliances can be facilitated.

Embodiment 2

Figure 9:
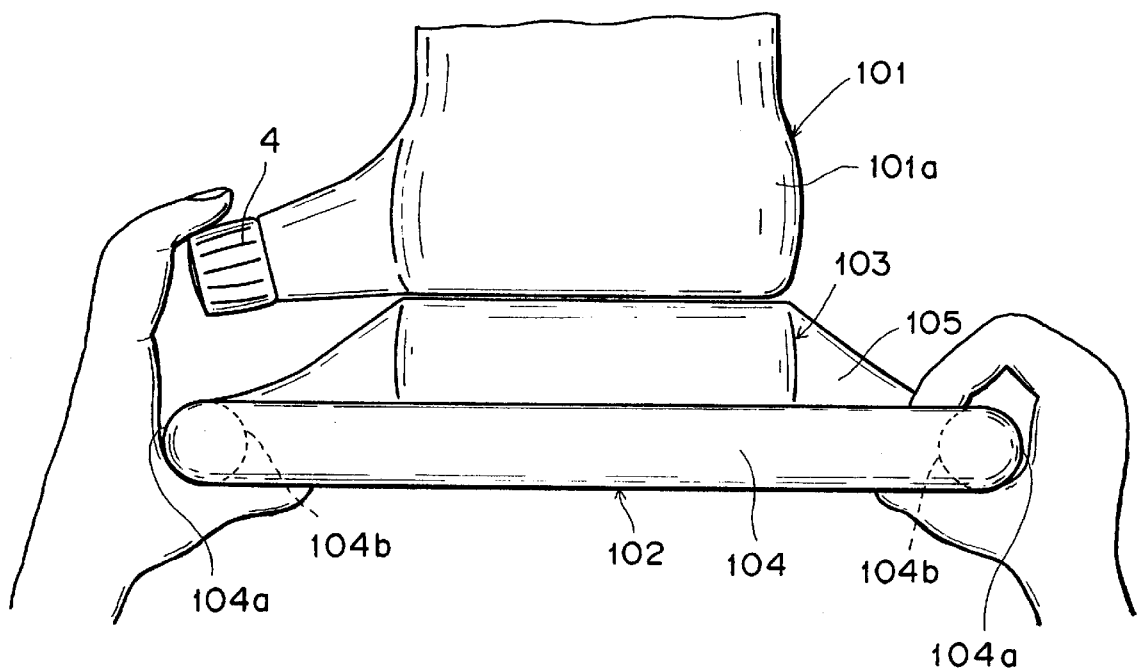
FIG. 9 is a plan view of the relative position of the lever switch according to a second embodiment of the invention in relation to the steering wheel.

Referring to FIG. 9, an explanation will be given of the second embodiment of the invention. In this embodiment, like reference numerals refer to like elements in the first embodiment.

In the lever switch 1 according to this embodiment, the first operating ring 4 is rotatably supported by the steering cover 101a. Namely, the cover member 18 and the steering cover 101a are integrally formed, and the second operating ring 5 and the push switch 31 (shown in FIGS. 4 and 5) are not provided.

In the lever switch 1 according to this embodiment also, as in the first embodiment, the driver can operate the first operating ring 4 while holding the steering wheel ring 104 so that the operability of various kinds of appliances can be facilitated.

Since the first operating ring 4 can be rotated around the operating shaft 3 by a relatively small force, is rotatably provided in both directions, and the width l of the first operating ring 4 is shorter compared to the entire length L of the operating shaft, the operability of various kinds of appliances such as the car navigation system and car radio can be facilitated.

What is claimed is:

1. A switch device arranged to be attached to a steering column of a steering assembly, which steering column rotatably supports a steering wheel for a vehicle composed of a boss, a ring located around said boss and a coupling member for coupling the boss and the ring, comprising:
    a switch device operating shaft attached to the steering column;
    a first operating ring, having a cylindrical form, arranged coaxially with the operating shaft so that said first operating ring is rotatable in opposite directions around the operating shaft, wherein the entire length of the operating shaft is shorter than a distance from the steering wheel boss to an outer edge of the steering wheel ring.

2. A switch device according to claim 1, wherein the entire length of the operating shaft is so set that a tip of the operating shaft is located between the outer edge and inner edge of the steering wheel ring in a radial direction of the steering wheel.

3. A switch device according to claim 1, wherein the first operating ring has a width occupying a major part of the entire length of the operating shaft in an axial direction of the operating shaft.

4. A switch device according to claim 1, wherein the first operating ring includes an attaching member rotatably attached to the operating shaft and an operating portion extending from the attaching member along the operating shaft,
    a frame member is provided which is attached to the operating shaft and has a supporting member for supporting the first operating ring, and
    the first operating ring is made of synthetic resin having a low friction coefficient between the operating shaft and the attaching member and between the supporting portion of the frame member and the operating portion.

5. A switch device according to claim 1, further comprising a rotary encoder for a pulse signal to an appliance, wherein said rotary encoder supplies a pulse signal to the appliance whenever a rotary displacement of said first operating ring reaches a preselected degree.

* * * * *